UNITED STATES PATENT OFFICE.

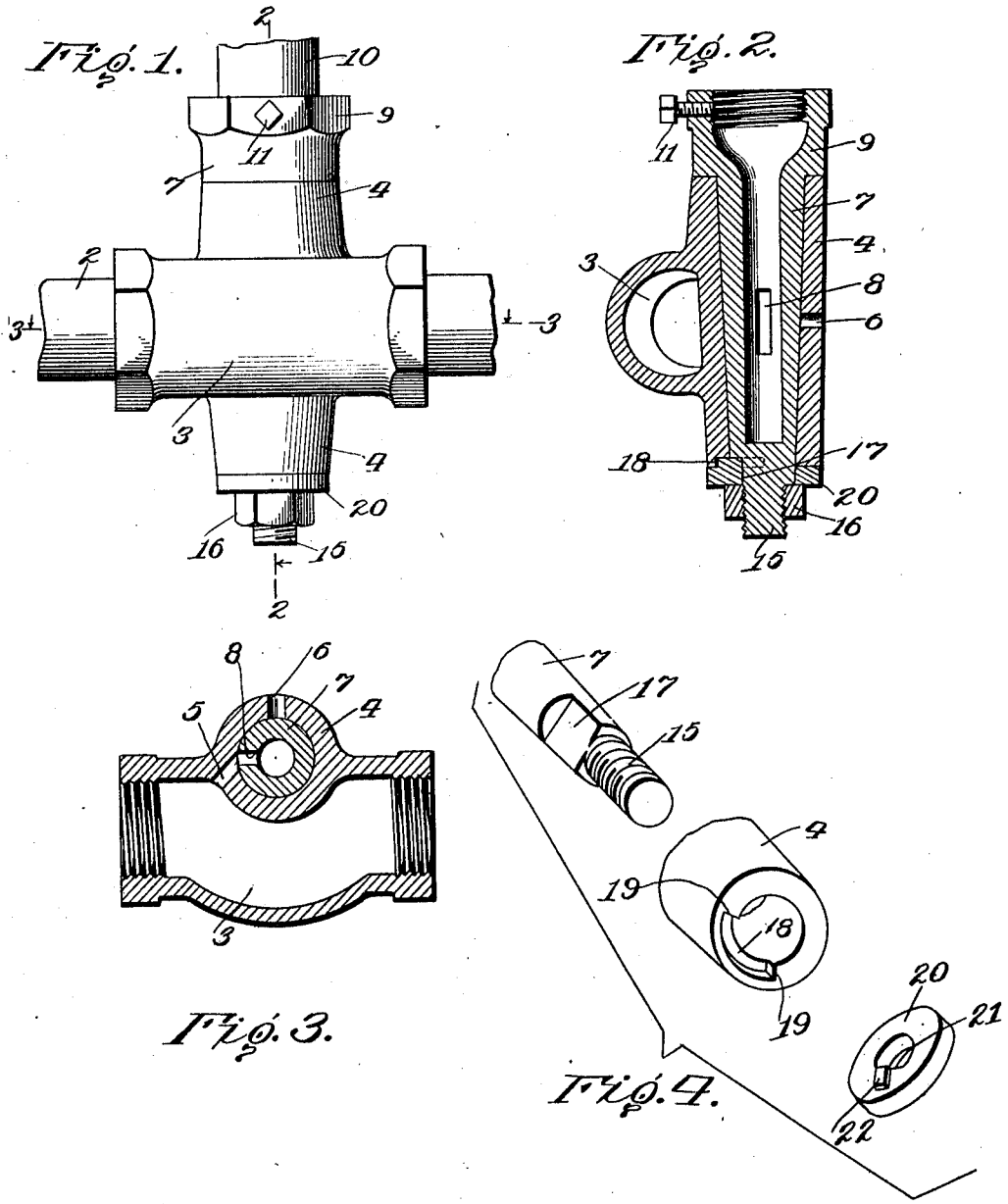

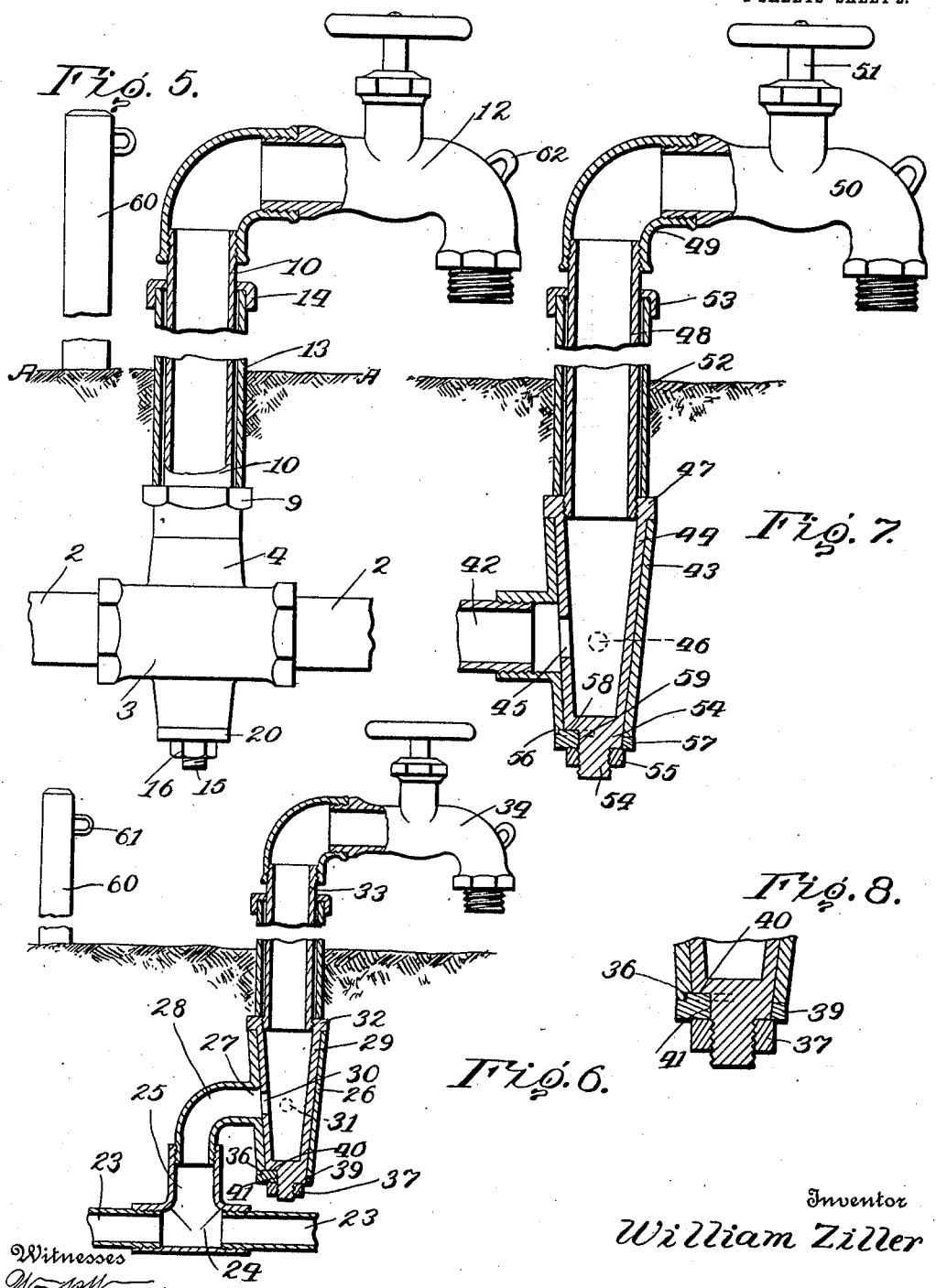

WILLIAM ZILLER, OF AUSTIN, TEXAS.

HYDRANT-VALVE.

1,004,225.  Specification of Letters Patent.  Patented Sept. 26, 1911.

Application filed March 13, 1911.  Serial No. 614,111.

*To all whom it may concern:*

Be it known that I, WILLIAM ZILLER, citizen of the United States, residing at Austin, in the county of Travis and State of Texas, have invented certain new and useful Improvements in Hydrant-Valves, of which the following is a specification.

This invention relates to valves of that type in which liquid passes from an inlet pipe to a delivery pipe through a valve plug connected to the delivery pipe, the latter pipe being in concentric relation to the axis of rotation of said plug.

The primary object of the invention is to provide a very simple and effective valve of this character which when open admits water freely to the valve plug and thence to the delivery pipe or riser of a hydrant or water bib, and which when closed will allow all the water in the riser and bib to be drained off.

A further object of my invention is to provide a construction of this character in which all the water may be drained from the bib and riser in order to prevent the water which would be otherwise contained within the bib and riser from freezing.

A still further object of this invention is to provide a construction of this character in which provision is made in the valve casing for the insertion of the improved valve at distances along the water main, and whereby when the valve is turned to cut off the flow of liquid through the riser the water in the main shall have free and uninterrupted flow.

A further object is to provide means for limiting the rotative movement of the valve from its closed to its opened position, said means being so disposed and so arranged that no dirt or other foreign matter can find lodgment therein and thus prevent or impede the proper rotation of the valve.

Other objects of the invention will appear in the course of the following description.

In the drawings I have illustrated three forms of my invention.

Figure 1 is an elevation of one form of my improved valve. Fig. 2 is a vertical section on the line 2—2 of Fig. 1. Fig. 3 is a horizontal section on the line 3—3 of Fig. 1. Fig. 4 is a fragmentary perspective view of the lower end of the valve casing, the lower end of the valve stem and the washer, the parts being separated from each other. Fig. 5 is an elevation partly sectional of the form of valve shown in Figs. 1 to 4 in combination with a riser and bib. Fig. 6 is a like view to Fig. 5 but showing a different form of valve and a different form of connection to the main water pipes. Fig. 7 is a like view to Fig. 5 but also showing a different form of connection between the valve casing and the water pipe and a slightly different form of valve. Fig. 8 is an enlarged sectional view of the lower end of the valve shown in Fig. 6.

Referring now to Figs. 1 to 5, 2 designates sections of a main pipe in which is located the coupling 3 forming part of a valve casing, this coupling being formed at opposite ends with screw threads for engagement with screw threads on the ends of the pipes forming the main line 2. As illustrated in Fig. 3, these screw threads are internal but they might be external as will be understood.

Intersecting the bore of the coupling 3 is a cylindrical tapering valve casing 4 which is formed integral with the coupling 3 and is formed with the outlet port 5, preferably located near the junction of the wall of the valve casing with the adjacent wall of the coupling. The valve casing is also provided with a drainage opening 6, preferably located at a point 90° distant from the port 5. The interior face of the valve casing is tapered, as before stated, from its upper to its lower end and this interior face is preferably ground or otherwise formed so as to be snugly engaged by a valve stem 7. This valve stem 7 is tubular and is tapered from one end to the other so as to conform to the bore of the valve casing 4, and the valve stem is provided with a port 8 having the form of a slot which registers with the inlet elongated port 5 when the valve is turned to its inlet position.

The upper end of the valve stem is formed with a many sided head 9 and is interiorly screw threaded for engagement with a delivery pipe 10 or riser. A set screw 11 passes through the head 9 and engages the lower end of the riser 10 so that when the set screw is in place the riser or delivery pipe 10 and valve stem are positively engaged with each other so that when the riser 10 is rotated it will rotate the valve. The riser 10 is provided with the usual faucet or bib 12 of any suitable character, which bib or faucet forms a handle whereby the riser and valve stem may be turned.

A protector pipe 13 which is larger than the delivery pipe or riser 10 is supported in any suitable manner upon the head 9, and this pipe is of sufficient diameter so that the riser or delivery pipe 10 may be easily turned within the protector pipe. The riser is also preferably provided with an annular shield 14 which extends over and down around the upper edges of the protector pipe 13. This is for a purpose to be later described.

The lower end of the valve stem 7 is reduced as at 15. This reduced portion is screw threaded for engagement with a nut 16. Means must be provided for limiting the movement of the valve stem 7 relative to the valve casing 4 so that when the valve stem is rotated to one position, the ports 5 and 8 will register and that when rotated to another position, the port 8 will register with the drainage port 6. For this purpose I have cut away the lower end of the stem 7 as at 17 so as to form a flat side or face, and form the lower end of the valve casing with an arcuate recess 18. The ends of this recess are defined by shoulders 19. Disposed between the nut 16 and the lower end of the valve casing 4 is the washer 20. This washer fits upon the lower end of the valve stem, and the interior bore of the washer has a flat face 21 which fits against the flat face 17 on the lower end of the valve stem so that though the washer may be withdrawn, it must turn with the valve stem. Carried upon the washer is the upwardly projecting lug 22 which projects into the recess 18 and which contacts with one or the other of the shoulders when the valve is turned to one or the other of its positions. The object of this construction last described is to provide a construction in which dirt and other foreign matter will be prevented from accumulating in the recess 18. It will be seen that the recess 18 is disposed on the inner face of the valve casing and that the washer 20 has the same diameter as the exterior diameter of the valve casing, and that therefore the washer projects beyond the recess 18 and thoroughly protects the same, forming a cap for the recess preventing the entrance of dirt. The washer 20 is held in snug engagement with the lower end of the valve casing by means of the nut 16 which may be turned up to any desired extent. This nut 16 of course acts to draw the valve stem 7 down into snug and water-tight engagement with the interior face of the valve casing 4.

In order to prevent dirt and other foreign matter from impeding the easy rotation of the riser or delivery pipe 10, I have provided the tubular protector pipe 13 which extends up to a point above the ground line A—A. The upper open end of this protector pipe 13 is covered by the shield 14 which prevents dirt or dust from collecting between the pipes 13 and 10, and also prevents the entrance of rain. It will be seen that this construction provides for a very easy rotation of the riser 10 and prevents the frictional resistance of the earth which is packed around the riser from impeding its rotation. In this form of my invention water flows along the main 2 and, if the valve be in its opened position, through the ports 5 and 8 into the hollow interior of the valve stem 7, thence up the riser 10 and is delivered at the bib or faucet. When it is desired to close the valve, the bib or faucet is used as a handle for rotating the riser 10 and the valve stem 7, thus shifting the port 8 out of register with the port 5, and upon a complete rotation of the valve stem shifting the port 8 into register with the port 6. When in registry with the port 6, all the water contained within the riser and the valve will flow out through the drainage port and thus the valve will be protected from freezing up. It is to be particularly noted that there is no obstruction to the constant flow of water through the main 2, whether the valve be open or closed, and that this construction is particularly adapted to be used where a series of risers or delivery pipes are connected to one main pipe.

Another form of my invention is illustrated in Fig. 6 wherein 23 designates the pipes of a main and 24 a T located therein, this T being provided with an outwardly projecting branch 25 as usual. This branch may be either interiorly or exteriorly screw threaded. The valve casing 26 is cylindrical and tapered from one end to the other and is open at both ends. It is provided with an inlet port 27 and from this inlet port extends a curved branch 28, screw threaded at its end for engagement with the branch 25. Disposed within the valve casing 26 is the hollow tapered valve 29 of the same character as previously described. This valve is provided with the inlet port 30 which corresponds to the port 8 in the previous construction. The port 30 as the valve is rotated is adapted in one position of the valve to register with the port 27, and in the other position of the valve to register with a drainage port 31, preferably located 90° from the port 27. The upper end of the valve stem is provided with a many sided head 32 corresponding to the many sided head 9 previously described, this head being interiorly screw threaded for engagement with the riser 33, this riser being provided with a bib 34, the riser being surrounded by a protector pipe and having a shield for the upper end of the same precisely as previously described. The lower end of the valve casing is provided with an arcuate recess 36 corresponding to the recess 18 previously described, and interposed between the tightening nut 37 and the lower end of the valve casing is the washer 39 having the lug 40. The lower end of the valve stem is cut away as described for the stem previously described so as to fit in a many sided central opening in the washer, thus permitting the washer to be removed from the valve stem in order to permit the valve to be removed from the valve casing. The washer is held in place by the nut 37, and the lug 40 engages in the arcuate recess 36 and thereby limits the rotation of the valve as previously described.

In Fig. 7 I show still another form of my invention as applied to the end of a main pipe 42. In this form the valve casing has the form of a T, one branch of the T being screw threaded to engage with the pipe 42. The body 43 of the T is tapered from one end to the other, and fitted within this body is the valve stem 44, this stem being tubular and being tapered. The stem is provided with an inlet port 45, and immediately opposite to the point of entrance to the pipe 42 is the drainage port 46 with which the port 45 may be turned into registry. The upper end of the valve stem is formed with a head 47, as previously described, and engaging therewith is the riser or delivery pipe 48 carrying at its upper end the elbow 49 provided with a bib 50 having the valve 51. A protector pipe 52 surrounds the riser 48 and extends to a short distance above the ground, the upper end of the protector pipe being covered by the shield 53. The lower end of the valve stem is reduced as at 54 and screw threaded for engagement with a nut 55. The lower end of the valve casing is formed with the arcuate recess 56, and interposed between the lower end of the valve casing and the nut is the washer 57 having a lug 58 and being provided with a many sided recess or perforation 59 which fits upon the reduced portion 54 in the valve stem in a manner previously described so that when the valve stem is rotated the washer 57 shall also be rotated, the lug 58 acting to limit the amount of rotation of the valve so that the port 45 will be brought into registry, either with the pipe 42 or with the drainage port 46. It is to be noted, of course, that the bib or faucet forms a handle whereby the riser or delivery pipe may be rotated. In order to hold the water closed off from the bib or riser and prevent any unauthorized drawing of water, I may provide the bib or faucet with a locking device whereby it may be closed in its turned off position to any suitable support. I have illustrated for this purpose in Figs. 5 and 6 an upwardly projecting post 60 having an eye 61, this being so arranged that when the bib is turned to a position to cut off the valve, an eye 62 on the bib will come adjacent to the eye 61, thus permitting the bib and the post to be locked together by means of a padlock or other suitable locking device. I of course do not wish to be limited to the use of the post as a means for locking the bib. Any fixed object will be sufficient for this purpose. This ability to lock the hydrant in its turned off position is particularly valuable for railroad stations where the water supply must be saved from waste, or the device can be used on underground feed pipes for oils or other valuable liquids so that they cannot be stolen or wasted. The valve itself being underground, will be beyond reach so that it cannot be tampered with. While I have illustrated the coupling 3 in Fig. 3 and the T 24 and the branch 43 as being formed with internal screw threads, I of course wish it understood that these parts might be in the form of nipples and exteriorly screw threaded.

My invention is simple, cheap to make, can be easily applied to any ordinary pipe or T and I have found it entirely effective for the purposes disclosed.

What I claim is:

1. The combination with a main liquid pipe, a rotatable riser, a bib connected thereto and a valve disposed in the bib and having a projecting handle, of a cylindrical valve casing having an inlet port in its wall communicating with the pipe and a drainage opening spaced from the inlet port, and a hollow rotatable valve stem disposed in said casing and having an inlet port adapted to register with either the inlet port or the drainage port, said stem being connected to the riser to form a continuation thereof.

2. A valve of the character described, including a hollow body adapted at its ends for engagement with a supply pipe, a tubular tapering valve casing intersecting said body, one wall of the said body forming one wall of the valve casing, said casing being provided with an inlet port opening into the hollow body adjacent to the wall thereof and an outlet port forming a drainage opening, a tubular tapering valve stem disposed in said casing and having a port adapted to register with either the inlet port or the drainage port of the casing, one end of the valve casing being formed with an arcuate recess on its inside face, a nut having screw threaded engagement with the lower end of the stem, and a washer interposed between the nut and the recessed end of the casing, having a diameter equal to the exterior diameter of the casing and provided on its inside face with a lug engaging in said arcuate recess.

3. A valve of the character described, including a valve casing tapered from one end to the other and having an inlet port in its wall, one end of the valve casing being formed with an arcuate recess on its inside face, a tapered valve stem disposed within the valve casing and having a reduced portion projecting beyond the same, said reduced portion being screw threaded and having at its opposite end a head engaging with the end of the valve casing, a nut on the reduced portion, and a washer interposed between the nut and the adjacent end of the valve casing, said washer having an inwardly projecting lug projecting into said recess, the washer and valve stem having a common rotative movement.

4. A valve of the character described, including a tapered valve casing having an inlet port, one end of the valve casing being formed with an arcuate recess on its inside face, a tapered valve disposed within said casing, one end of the valve having a head extending over the adjacent end of the valve casing, the other end of the valve being reduced to form a terminal member and screw threaded and projecting beyond the valve casing, said terminal member at its base being many sided, a nut on the extremity of the terminal member, and a washer having a many sided opening engaging the many sided portion of the terminal member for a rotative movement therewith, said washer having an inwardly projecting lug spaced from its circumference and projecting into said recess in the casing.

5. A valve of the character described, including a cylindrical tapered valve casing having an inlet port in its wall, a hollow tapered rotatable valve disposed in said casing and having an inlet port adapted to register with the inlet port of the casing, the lower end of the valve casing being formed with an arcuate recess, one end of said recess being in alinement with the inlet port of the casing, the adjacent end of the valve having a reduced terminal member projecting beyond the valve casing, the extremity of the terminal member being screw threaded, a nut engaging the screw threads, and a member disposed between the nut and the end of the casing, said member rotatable with the valve and having the same diameter as the exterior diameter of the casing, said member being provided with a lug projecting into the recess.

In testimony whereof, I affix my signature in presence of two witnesses.

WILLIAM ZILLER. [L. S.]

Witnesses:
 HERMAN PRESSLER,
 W. H. CULLEN.

---

Copies of this patent may be obtained for five cents each, by addressing the "Commissioner of Patents, Washington, D. C."